(12) United States Patent
Pakulski et al.

(10) Patent No.: US 7,264,786 B2
(45) Date of Patent: Sep. 4, 2007

(54) METHOD OF SCAVENGING HYDROGEN SULFIDE AND/OR MERCAPTANS FROM FLUID AND GAS STREAMS

(75) Inventors: Marek K. Pakulski, The Woodlands, TX (US); Patrick Logan, Spring, TX (US); Ron Matherly, Sugarland, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/829,582

(22) Filed: Apr. 21, 2004

(65) Prior Publication Data

US 2005/0238556 A1    Oct. 27, 2005

(51) Int. Cl.
*B01D 53/14*    (2006.01)
(52) U.S. Cl. ..................................... 423/228
(58) Field of Classification Search ............... 423/226, 423/228, 229, 242.7
See application file for complete search history.

(56) References Cited

U.S. PATENT DOCUMENTS

| 4,271,132 | A | * | 6/1981 | Eickmeyer ............ 423/223 |
|---|---|---|---|---|
| 4,452,764 | A | * | 6/1984 | Oakes et al. ............ 423/228 |
| 4,569,766 | A | | 2/1986 | Kool et al. |
| 5,128,049 | A | | 7/1992 | Gatlin |
| 5,413,627 | A | * | 5/1995 | Landeck et al. ............ 95/235 |
| 5,462,721 | A | * | 10/1995 | Pounds et al. ............ 423/226 |
| 5,478,541 | A | | 12/1995 | Samuels et al. |
| 6,063,346 | A | | 5/2000 | Luna |
| 6,267,938 | B1 | * | 7/2001 | Warrender et al. ......... 423/226 |
| 6,663,841 | B2 | | 12/2003 | Salma et al. |

FOREIGN PATENT DOCUMENTS

WO    WO9201481 A1 *    2/1992

* cited by examiner

*Primary Examiner*—Edward M. Johnson
(74) *Attorney, Agent, or Firm*—Jones & Smith, LLP; John Wilson Jones

(57) ABSTRACT

Hydrogen sulfide and mercaptans may be removed from a fluid or gaseous stream by reacting the hydrogen sulfide and mercaptans in the stream with a scavenger selected from a:
 (i.) 1,3,5-trisalkanylamino hexahydro-1,3,5-triazine derivative;
 (ii.) morpholine or piperazine derivative;
 (iii.) amine oxide;
 (iv.) alkanolamine; or
 (v.) aliphatic or aromatic polyamine.

18 Claims, No Drawings

METHOD OF SCAVENGING HYDROGEN SULFIDE AND/OR MERCAPTANS FROM FLUID AND GAS STREAMS

FIELD OF THE INVENTION

Hydrogen sulfide and mercaptans may be removed from a fluid or gas stream, including liquid and gaseous mixtures of hydrocarbons, by contacting the stream with a scavenger of a hexahydrotriazine derivative, a morpholine or piperazine derivative, an amine oxide, an alkanolamine or a polyamine.

BACKGROUND OF THE INVENTION

In the drilling, production, transport, storage, and processing of crude oil, including waste water associated with crude oil production, and in the storage of residual fuel oil, hydrogen sulfide and mercaptans are often encountered. The presence of hydrogen sulfide and mercaptans is objectionable because they often react with other hydrocarbons or fuel system components. Further, hydrogen sulfide and mercaptans are often highly corrosive as well as emit highly noxious odors. Uncontrolled emissions of hydrogen sulfide gives rise to severe health hazards. Burning of such vapors neither solves toxic gas problems nor is economical since light hydrocarbons have significant value.

Furthermore, hydrogen sulfide and mercaptans are often present in the underground water removed with the crude oil, in the crude oil itself and in the gases associated with such water and oil. When the water and oil are separated from each other, hydrogen sulfide is emitted as a gas which is associated with water and hydrocarbon vapors. Natural gases further often contain hydrogen sulfides.

The use of various compounds to react with hydrogen sulfide and mercaptans has been known in the art. For example, U.S. Pat. No. 6,063,346 discloses the use of a combination of triazines, maleimides, formaldehydes, amines, carboxamides, alkylcarboxyl-azo compounds and cumine-peroxide compounds for the removal of hydrogen sulfide and mercaptan contaminants from a fluid. U.S. Pat. No. 5,128,049 further discloses the use of certain triazine, morpholino and amino derivatives for the removal of hydrogen sulfide content from fluids.

Generally, such compounds are either too expensive for commercial use or evidence insufficient levels of mercaptan and/or hydrogen sulfide removal. Better alternatives for the removal of hydrogen sulfide as well as mercaptans have therefore been sought.

SUMMARY OF THE INVENTION

Hydrogen sulfide and/or mercaptans may be removed from a fluid or gaseous stream by contacting the stream with an effective amount of a hydrogen sulfide and/or mercaptan scavenger selected from the group consisting of:

(i.) 1,3,5-trisalkanylamino hexahydro-1,3,5-triazine derivatives;

(ii.) morpholine or piperazine derivatives;

(iii.) amine oxides, especially those of the formula $(R_1)(R_2)(R_3)N \rightarrow O$ wherein $R_1$ is an alkyl, alkenyl, alkylarylalkylene, alkenylarylalkylene, alkylaminoalkylene, alkenylaminoalkylene, alkylamidoalkylene, or alkenylamidoalkylene group, wherein each of said alkyl groups contains from about 8 to about 24 carbon atoms and may be branched or straight chained and saturated or unsaturated, and wherein said alkylene groups have from about 1 to about 6 carbon atoms; and $R_2$ and $R_3$ are independently aliphatic chains having about 1 to about 30 carbon atoms;

(iv.) an alkanolamine, preferably either a monoalkanolamine, dialkanolamine or trialkanolamine; and (v.) an aliphatic or aromatic polyamine having at least two amine or substituted amino groups per molecule, preferably a polyalkylene or aromatic polyamine having from 1 to about 4 secondary amine groups per molecule wherein each alkylene group contains between from about 2 to about 8 carbon atoms and the amino group is of the formula —$N(R_8)(R_9)$ wherein each $R_8$ and $R_9$ are independently selected from —H or a $C_1$-$C_6$ alkyl or alkylene group.

DETAILED DESCRIPTION OF THE PREFERRED EMBODIMENTS

In the present invention, a fluid or gaseous stream is brought into contact with a hydrogen sulfide and/or mercaptan scavenger. The invention is applicable to a wide variety of fluid streams, including liquefied petroleum gas as well as crude oil and petroleum residual fuel, heating oil, etc. In addition, the invention is applicable to gaseous hydrocarbon streams. For instance, the scavenger may be contacted with wet or dry gaseous mixtures of hydrogen sulfide and/or mercaptan and hydrocarbon vapors, such as is found, for instance, in natural gas or obtained in the drilling, removal from the ground, storage, transport, and processing of crude oil.

The hydrogen sulfide and/or mercaptan scavengers useful in the present invention may be selected from the group consisting of:

(i.) 1,3,5-trisalkanylamino hexahydro-1,3,5-triazine derivatives;

(ii.) morpholine or piperazine derivatives;

(iii.) amine oxides;

(iv.) alkanolamines; and (v.) aliphatic or aromatic polyamines.

Suitable 1,3,5-trisalkanylamino hexahydro-1,3,5-triazine derivatives are those of the formula:

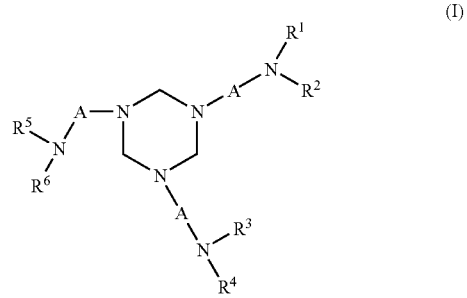

(I)

wherein each A is independently selected from the formula —$(CHR^7)_x$ wherein x is from 1 to about 6 and each $R^1$, $R^2$, $R^3$, $R^4$, $R^5$, $R^6$ and $R^7$ is independently selected from —H or a $C_1$-$C_6$ alkyl.

In a preferred embodiment, the 1,3,5-trisalkanylamino hexahydro-1,3,5-triazine derivative is 1,3,5-tris[3-(dimethylamino)propyl]hexahydro-1,3,5-triazine, 1,3,5-tris[2-(dimethylamino)ethyl]hexahydro-1,3,5-triazine, 1,3,5-tris[3-(diethylamino)propyl]hexahydro-1,3,5-triazine or 1,3,5-tris[2-(diethylamino)ethyl]hexahydro-1,3,5-triazine.

The morpholine or piperazine derivative is a nitrogen heterocyclic compound of the formula:

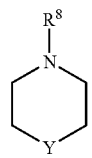

(II)

wherein Y is —N or —O and $R^8$ is an aminoalkyl group containing between 2 to 4 carbon atoms. Preferred as $R^8$ are 2-aminoethyl and 2-hydroxyethyl. Further preferred are morpholine bottoms, the residuum obtained from morpholine processing, commercially available, for example, as Huntsman C-6 amine.

Further preferred are alkyl and alkene amidopropyldimethylamine oxides, such as those amine oxides of the formula $(RCONHCH_2CH_2CH_2)(CH_3)_2N{\rightarrow}O$ wherein R is a radical selected from the group of decyl, cocoyl, lauryl, acetyl and oleyl.

The alkanolamine is preferably a monoalkanolamine, dialkanolamine or trialkanolamine and mixtures thereof wherein the alkanol group may be straight or branched. In a preferred embodiment, the alkanolamine is of the formula $(R_4)(R_5)N(R_6)OH$ wherein $R_6$ is a $C_1$-$C_{12}$ linear or branched alkyl group, $R_4$ and $R_5$ are independently selected from hydrogen, $R_6$ or $R_7$—OH, and $R_7$ is methylene or a $C_2$-$C_8$ linear or branched alkylene group.

Suitable monoalkanolamines include monoethanolamine, monomethanolamine, monopropanolamine, monobutanolamine, monopentanolamine, monohexanolamine, monoheptanolamine, monooctanolamine, and monononanolamine. A preferred alkanolamine is monoethanolamine.

Suitable dialkanolamines include ethyldiethanolamine, dimethanolamine, methanolethanolamine, diethanolamine, methanolpropanolamine, ethanolpropanolamine, dipropanolamine, methanolbutanolamine, ethanolbutanolamine, propanolbutanolamine, dibutanolamine, dipentanolamine, dihexanolamine, diheptanolamine and dioctanolamine. Preferred trialkanolamines include triethanolamine and tripropanolamine.

The polyamine preferably includes at least two amine groups per molecule, typically between from about 2 to about 6 amine groups per molecule. Such polyamines include polyalkylene and aromatic polyamines having from about 1 to about 4 primary or secondary amine groups per molecule group of the formula —$N(R_8)(R_9)$ wherein each $R_8$ and $R_9$ are independently selected from a —H or a $C_1$-$C_6$ alkyl wherein each alkylene group contains between from two to about eight carbon atoms. In a preferred mode, the polyalkylene polyamines are dialkylene triamine, trialkylene tetraamine, pentaalkylene hexamine, or a mixture thereof such as diethylene triamine, trimethylene tetraamine, and pentaethylene hexamine. Further representative polyamines include N,N'-di-sec-butyl-p-phenylenediamine, tris-(2-aminoethylamine), ethylenediamine, propylenediamine, triethylenetetramine, tetraethylenepentamine, tetrabutylenepentamine, hexaethyleneheptamine, hexapentyleneheptamine, heptaethyleneoctamine, octaethylenenonamine, nonaethylenedecamine, decaethyleneundecamine, decahexyleneundecamine, undecaethylenedodecamine, dodecaethylenetridecamine, and tridecaethylenetetradecamine.

Further preferred are those polyalkylene polyamines of the formula $R_{10}R_{11}N(R_{12}R_{13}N)_zR_{14}$, where $R_{10}$, $R_{11}$, $R_{13}$, and $R_{14}$ are independently —H or a $C_1$-$C_{30}$ alkyl or aryl group, $R_{12}$ is a methylene or a $C_2$-$C_{24}$ alkylene group, and z is 0 to 1000.

The process of the invention has particular applicability to the removal of those mercaptans of the formula R—SH wherein R is an alkyl group having from 1 to 40 carbon atoms and preferably from 1 to 20 carbon atoms, most preferably from 1 to 6 carbon atoms since these mercaptans are most desirable for removal due to their noxious and corrosive nature.

The scavenger may be added to any aqueous or nonaqueous medium containing hydrogen sulfide and/or mercaptan where the amount of hydrogen sulfide is sought to be reduced. Wet gaseous mediums are those containing water vapors and/or hydrocarbon vapors. Thus, the method of present invention is useful in controlling hydrogen sulfide and/or mercaptans in water systems, oil and gas production and storage systems, and other similar systems. The scavenger, upon contact with the fluid or feedstock, reacts with the hydrogen sulfide and mercaptans so as to provide products which are environmentally benign.

Generally, for industrial or commercial use, the scavenger may be contacted with a stream containing the hydrogen sulfide or mercaptans for removal. Contact can occur in a variety of containers, such as a process or transport line, a separate stirred or non-stirred container or other vessels such as scrubbers or strippers. Further, the scavenger may be vaporized and introduced as a gas to be contacted with another fluid. Alternatively, solid or stabilized liquid scavenger may be sprayed or added into a system. Further, a solution can be added via surface or downhole equipment or at any time in the process stream in recovering crude oil so as to remove the noxious quality and corrosive nature of the hydrogen sulfide and mercaptans in the processing system.

The scavengers may be added neat or diluted with water or solvent and may be formulated or blended with other suitable materials or additives. It is preferred that the scavenger be introduced to the hydrocarbon stream as a homogeneous mixture. Where water is present, the scavenger is selected so that the reaction product of scavenger and hydrogen sulfide and/or mercaptan is preferably soluble both in water and in the feedstream. For liquid systems, suitable solvents for dissolving the scavenger include polar and non-polar solvents such as water, alcohols, esters, benzene and benzene derivates. The preferred solvents include water, ethyl acetate, acetone, kerosene, aromatic naphtha, benzene, toluene and xylene.

In general, the hydrogen sulfide and/or mercaptan scavenger in the method of the present invention is injected into or otherwise brought into intimate contact with the liquid hydrocarbon, hydrogen sulfide and/or mercaptan and, when present, water and/or solvent in any convenient manner. With emissions from a residual fuel oil, the scavenger may be stirred into the fuel oil. When used with a natural gas, the natural gas may be scrubbed with an aqueous or nonaqueous solution of the scavenger. Additionally, when the natural gas, as it often does, contains water vapors, the scavenger may be injected into a stream of the gas moving within a conduit. In such case, when the water vapors are removed from the natural gas as a liquid, the product of the hydrogen sulfide and/or mercaptan and scavenger will also be removed. The scavenger can further be used in scavenging hydrogen sulfide and/or mercaptans from recovered substances obtained form subterranean wells.

The amount of the scavenger used in accordance with the present invention will depend on the amount of the hydrogen sulfide and/or mercaptan in the medium being treated. In general, the amount of the scavenger added to the medium is at least an effective scavenging amount, for example, from about 20 ppm to about 2,000 ppm or more, preferably from about 40 to about 1,200 ppm, and more preferably from about 100 to about 400 ppm of hydrogen sulfide and/or mercaptan.

In general, it is desirous to conduct the process in temperatures at between from about 40 to about 150, preferably between from about 85 to about 120, ° C.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Approximately 2.7 weight percent of scavenger in methylcyclohexane or a 50:50 volume percent methylcyclohexane/isopropanol mixture were introduced to n-propyl mercaptan and/or nonyl mercaptan solutions in methylcyclohexane. Both mercaptan concentrations were approximately 0.04 Mol/L. The scavenger was permitted to intimately mix with the mercaptan for 1 hour at 160 F. An additional test was run with nonyl mercaptan at 0° C. for 72 hours (LT test). Mercaptan removal was monitored and quantitated using GC/MS analysis. The results are set forth in Table I below.

From the foregoing, it will be observed that numerous variations and modifications may be effected without departing from the true spirit and scope of the novel concepts of the invention.

What is claimed is:

1. A method for scavenging hydrogen sulfide and/or mercaptans from a liquid or gaseous stream which comprises bringing the stream into contact with a scavenging effective amount of at least one scavenger selected from the group consisting of:

(i.) a 1,3,5-trisalkanylamino hexahydro-1,3,5-triazine derivative of the formula:

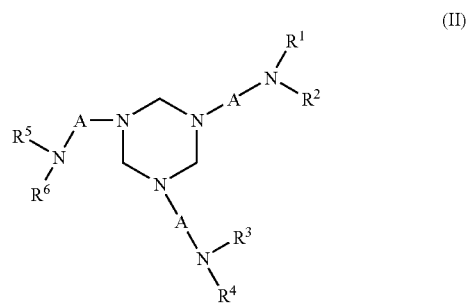

wherein each A is independently selected from the formula —$(CHR^7)_x$ wherein x is from 1 to about 6 and each $R^1$, $R^2$, $R^3$, $R^4$, $R^5$, $R^6$ and $R^7$ is independently selected from —H or a $C_1$-$C_6$ alkyl;

(ii.) a nitrogen heterocyclic compound of the formula: e

TABLE I

| | | % Mercaptan Remaining | | |
| Example No. | Scavenger | n-PrSH | $C_9H_{19}SH$ | $C_9H_{19}SH$ LT |
| --- | --- | --- | --- | --- |
| | Control | 100 | 100 | 100 |
| 1 | Morpholine bottoms | 68 | 34 | 24 |
| 2 | N,N'-di-sec-butyl-p-phenylenediamine | 56 | 61 | 64 |
| 3 | 1,3,5-tris-[3-(dimethylamino)propyl] hexahydro-1,3,5-triazine | 89 | 65 | — |
| 4 | Tris-(2-aminoethylamine) | 91 | — | — |
| 5 | Tetraethylenepentamine | 68 | 88 | — |
| 6 | Laurylamidopropyldimethylamine oxide | — | 35 | 31 |
| 7 | 1:1 nitromethane and Morpholine bottoms | — | 60 | — |
| 8 | $C_{14}$–$C_{16}$ dimethylamine oxide | — | 22 | 26 |
| 9 | Tetradecyldimethylamine oxide | — | 36 | 31 |
| 10 | Octadecyldimethylamine oxide | — | 24 | 34 |
| 11 | N-aminoethyl-(ethanolamine) | — | 35 | 0 |
| 12 | Monoethanolamine | — | 17 | 1 | wherein Y is —N or —O and R⁸ is 2-aminoethyl or 2-hydroxyethyl; and (iii.) an amine oxide of the formula (RCONHCH₂CH₂CH₂)(CH₃)₂N→O wherein R is a radical selected from the group consisting of decyl, cocoyl, lauryl, cetyl and oleyl and thereby scavenging hydrogen sulfide and/or mercaptan from the liquid or gaseous stream.

2. The method of claim 1, wherein the at least one scavenger is the 1,3,5-trisalkanylamino hexahydro-1,3,5-triazine derivative.

3. The method of claim 2, wherein the 1,3,5-trisalkanylamino hexahydro-1,3,5-triazine derivative is 1,3,5-tris[3-(dimethylamino)propyl]hexahydro-1,3,5-triazine, 1,3,5-tris[2-(dimethylamino)ethyl]hexahydro-1,3,5-triazine, 1,3,5-tris[3-(diethylamino)propyl]hexahydro-1,3,5-triazine or 1,3,5-tris[2-(diethylamino)ethyl]hexahydro-1,3,5-triazine.

4. The method of claim 1, wherein the at least one scavenger comprises the nitrogen heterocyclic compound of (ii).

5. The method of claim 1, wherein the at least one scavenger is an amine oxide of formula (iii).

6. A method for scavenging hydrogen sulfide and/or mercaptan contaminants from a hydrocarbon stream, comprising mixing the hydrocarbon stream with a scavenging effective amount of at least one scavenger selected from the group consisting of a:

(i.) 1,3,5-trisalkanylamino hexahydro-1,3,5-triazine derivative of the formula:

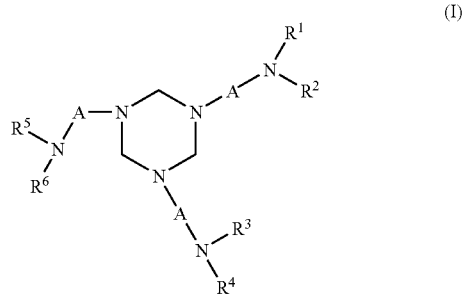

(I)

wherein each A is independently selected from the formula —(CHR⁷)ₓ wherein x is from 1 to about 6 and each R¹, R², R³, R⁴, R⁵, R⁶ and R⁷ is independently selected from —H or a C₁-C₆ alkyl;

(ii.) nitrogen heterocyclic compound of the formula:

(II)

wherein Y is —N or —O and R⁸ is 2-aminoethyl or 2-hydroxyethyl; and (iii.) amine oxide of the formula (RCONHCH₂CH₂CH₂)(CH₃)₂N→O wherein R is a radical selected from the group consisting of decyl, cocoyl, lauryl, cetyl and oleyl and thereby scavenging hydrogen sulfide and/or mercaptan contaminants from the hydrocarbon stream.

7. The method of claim 6, wherein the at least one scavenger comprises a 1,3,5-trisalkanylamino hexahydro-1,3,5-triazine derivative selected from the group consisting of 1,3,5-tris[3-(dimethylamino)propyl]hexahydro-1,3,5-triazine, 1,3,5-tris[2-(dimethylamino)ethyl] hexahydro-1,3,5-triazine, 1,3,5-tris[3-(diethylamino)propyl]hexahydro-1,3,5-triazine and 1,3,5-tris[2-(diethylamino)ethyl]hexahydro-1,3,5-triazine.

8. The method of claim 6, wherein the at least one scavenger comprises an amine oxide of formula (iii).

9. The method of claim 1, wherein the liquid or gaseous stream is selected from the group consisting of liquefied petroleum gas, crude oil, petroleum residual oil and heating oil.

10. A method for scavenging hydrogen sulfide and/or mercaptans from a liquid stream which comprises bringing the stream into contact with a scavenging effective amount of at least one scavenger selected from the group consisting of a:

(i.) 1,3,5-trisalkanylamino hexahydro-1,3,5-triazine derivative of the formula:

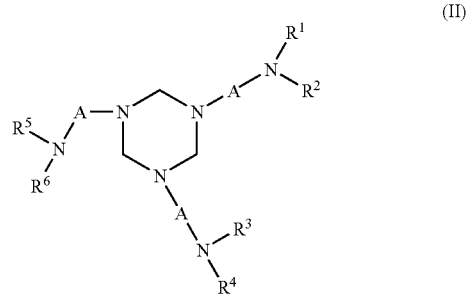

(II)

wherein each A is independently selected from the formula —(CHR⁷)ₓ wherein x is from 1 to about 6 and each R¹, R², R³, R⁴, R⁵, R⁶ and R⁷ is independently selected from —H or a C₁-C₆ alkyl;

(ii.) a nitrogen heterocyclic compound of the formula:

(I)

wherein Y is —N or —O and R⁸ is 2-aminoethyl or 2-hydroxyethyl; and (iii.) an amine oxide of the formula (RCONHCH₂CH₂CH₂)(CH₃)₂N→O wherein R is a radical selected from the group consisting of decyl, cocoyl, lauryl, cetyl and oleyl and thereby scavenging hydrogen sulfide and/or mercaptans from the liquid or gaseous stream wherein the scavenger is added neat or diluted with a solvent selected from the group consisting of alcohols, esters, benzene, benzene derivatives, acetone, kerosene and aromatic naphtha.

11. The method of claim 4, wherein R¹ is 2-aminoethyl.

12. The method of claim 4, wherein R¹ is 2-hydroxyethyl.

13. The method of claim 6, wherein the hydrocarbon is selected from the group consisting of liquefied petroleum gas, crude oil, petroleum residual oil and heating oil.

14. The method of claim 6, wherein the at least one scavenger comprises the nitrogen heterocyclic compound of (ii).

15. The method of claim 1, wherein the method is conducted at a temperature between from about 40° C. to about 150° C.

16. The method of claim 15, wherein method is conducted at a temperature of about 85° C. to 120° C.

17. The method of claim 1, wherein the liquid or gaseous stream is a wet or dry gaseous mixture of hydrogen sulfide and/or mercaptan and hydrocarbon vapors.

18. The method of claim 1, wherein the at least one scavenger is vaporized and then introduced as a gas to the liquid or gaseous stream.

* * * * *